W. M. SUBLETTE.
ROTARY INTERNAL COMBUSTION ENGINE.
APPLICATION FILED APR. 3, 1916.

1,209,067.

Patented Dec. 19, 1916.
5 SHEETS—SHEET 1.

W. M. SUBLETTE.
ROTARY INTERNAL COMBUSTION ENGINE.
APPLICATION FILED APR. 3, 1916.

1,209,067.

Patented Dec. 19, 1916.
5 SHEETS—SHEET 4.

WITNESSES.
Robt. D. Pearson.
C. E. Lodge.

INVENTOR.
William M. Sublette
BY
F. C. Bates
ATTORNEY.

UNITED STATES PATENT OFFICE.

WILLIAM M. SUBLETTE, OF SAN JOSE, CALIFORNIA.

ROTARY INTERNAL-COMBUSTION ENGINE.

1,209,067.   Specification of Letters Patent.   Patented Dec. 19, 1916.

Application filed April 3, 1916. Serial No. 88,529.

*To all whom it may concern:*

Be it known that I, WILLIAM M. SUBLETTE, a citizen of the United States, and a resident of San Jose, in the county of Santa Clara and State of California, have invented a certain new and useful Improvement in Rotary Internal - Combustion Engines, of which the following is a specification.

My invention relates to improvement in rotary internal combustion engines, and the objects of my invention are, first, to provide a rotary internal combustion engine in which the driving power is produced by gas explosions.

Another object of my invention is to provide a rotating internal combustion engine in which power may be produced with a very small amount of friction, and one in which the gases are continuously firing between the expansion chamber stationary heads and rotating heads alternate in action.

Another object of my invention is to produce a rotary internal combustion engine that may be economically constructed, simple in operation, efficient and durable, and one which may be adapted to any purpose where power is required.

Figure 1:
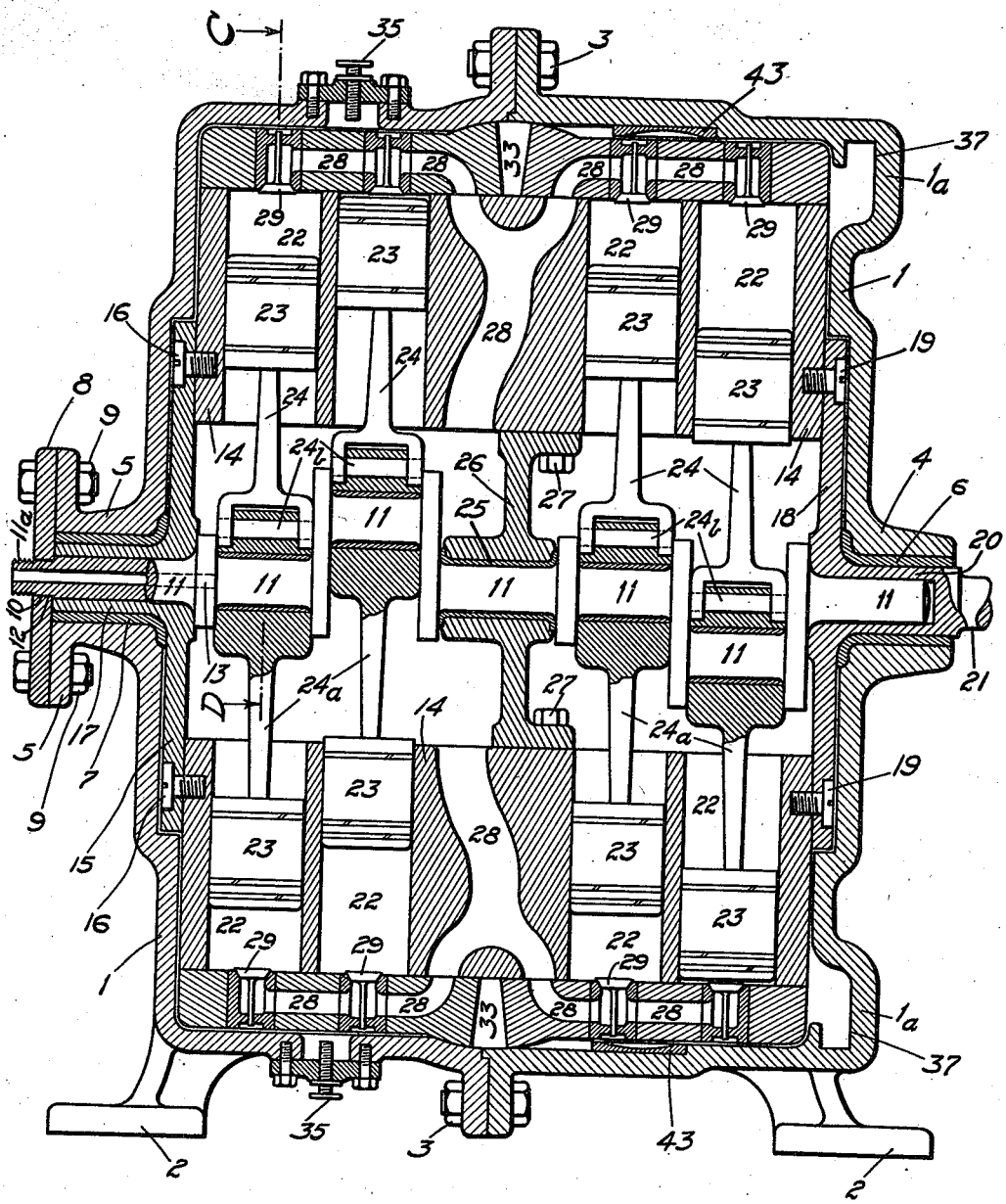
Figure 2:
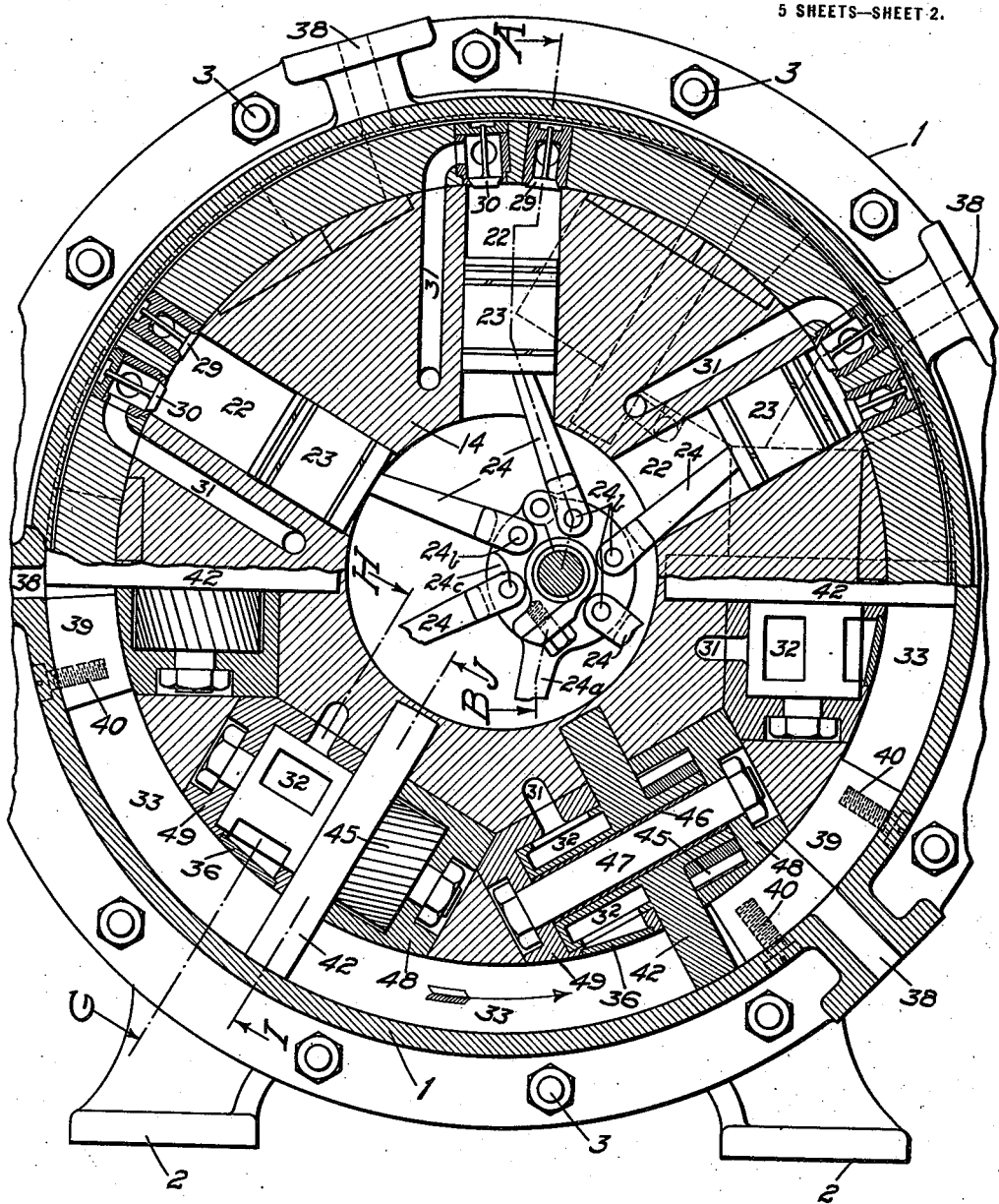
Figure 3:
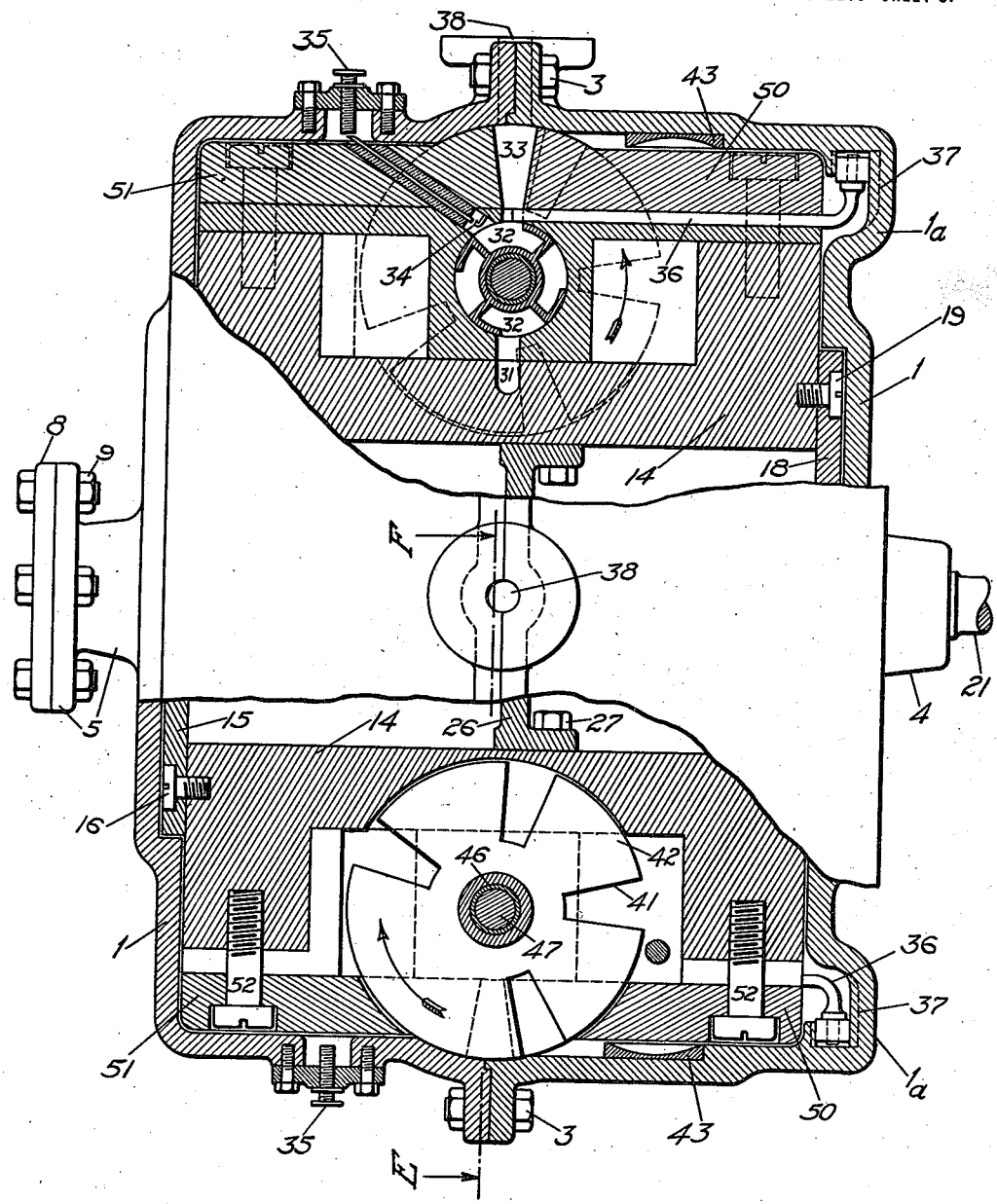
Figure 4:
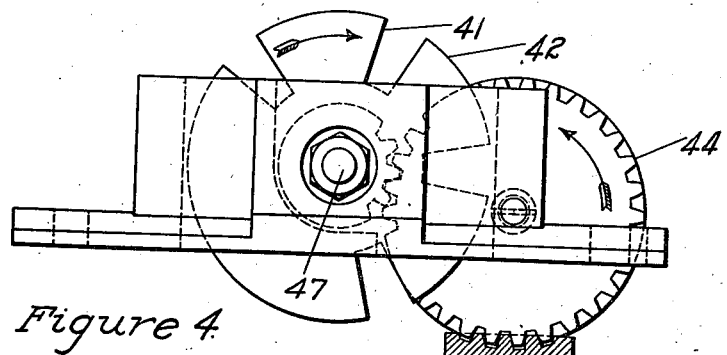
Figure 5:
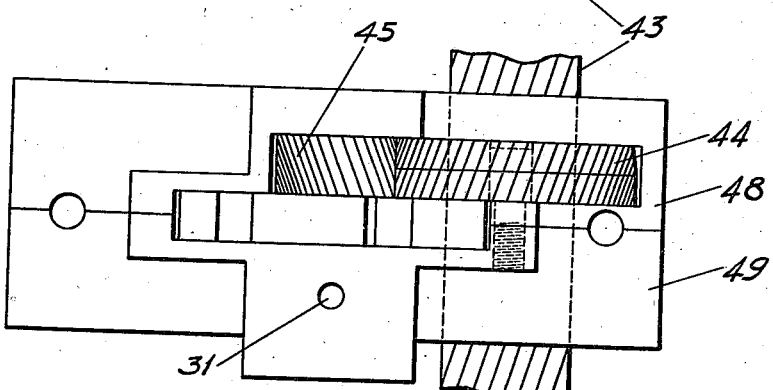
Figures 6, 7, 8:
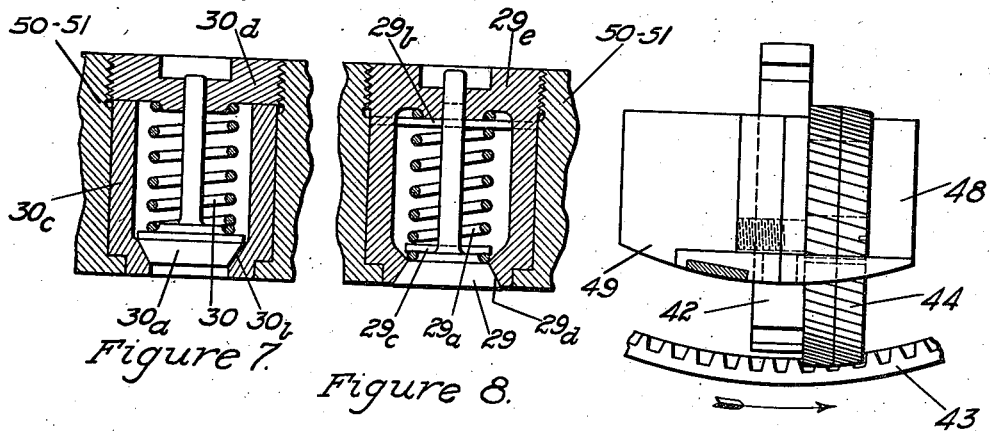
Figures 9, 10:
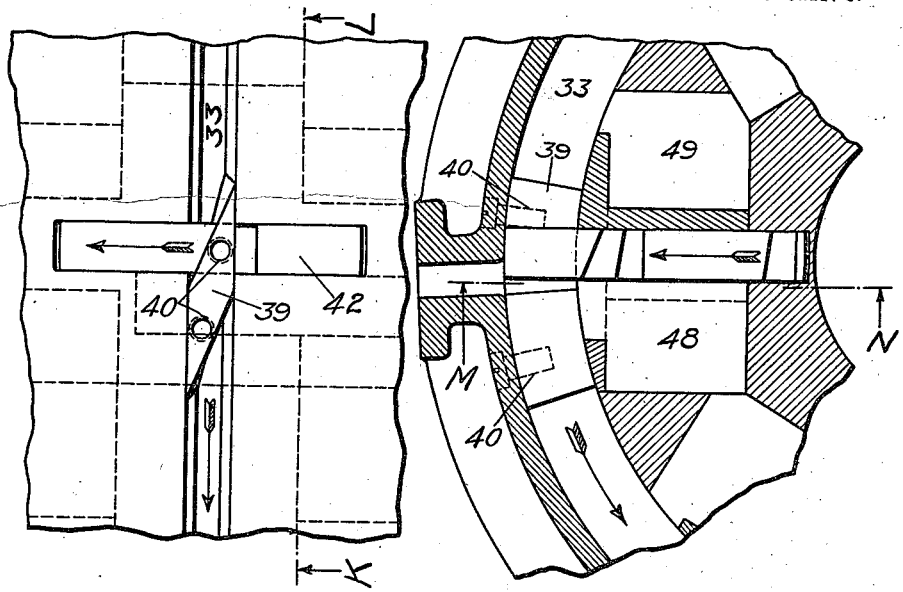
Figure 11:
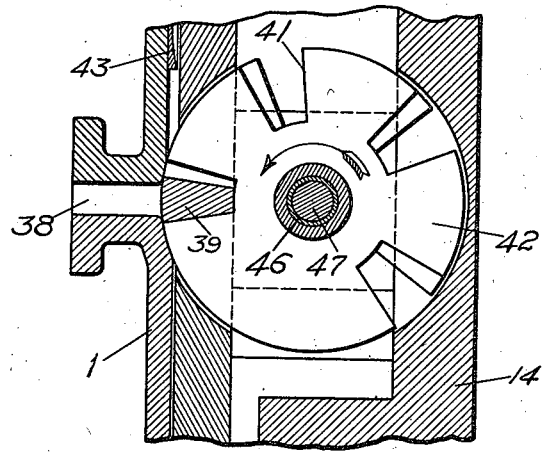

In the accompanying drawings: Figure 1 is a sectional view on line A—B of Fig. 2 showing internal connections of the compression cylinders. Fig. 2 is a combination transverse sectional view on line C—D of Fig. 1, and line E—F of Fig. 3, showing internal connections of the compression cylinders; combustion and expansion chambers, exhaust ports, and their connections. Fig. 3 is a combination sectional view on line G—H and I—J, of Fig. 2, showing the combustion chambers, ignition system rotating heads and their connections. Fig. 4 is a side elevation of the gear drive for the rotating heads and combustion chambers. Fig. 5 is a plan view of Fig. 4. Fig. 6 is a front elevation of Fig. 4. Fig. 7 is a sectional view of a compression valve. Fig. 8 is a sectional view of an intake valve. Fig. 9 is a plan view showing an expansion chamber stationary head, passing through the rotating heads in the expansion chamber. Fig. 10 is a sectional view on line K—L of Fig. 9, showing expansion chamber stationary heads in the expansion chamber and passing through the rotating heads. Fig. 11 is a sectional view on line M—N, of Fig. 10, showing rotating head with the expansion chamber stationary head in section.

Corresponding and like parts are referred to in the following description and indicated in all the views of the drawings by the same reference numerals.

My rotary internal combustion engine, forming the subject matter of the present invention comprises a stationary outer casing 1 composed of metal casting having supports 2, which are an integral part thereof. said outer casing 1 being cast in two pieces, and bolted together by bolts 3, said casing 1 having main projections 4—5 which are an integral part thereof adapted to retain bearings 6—7, said projection 5 having a flange 8 fastened thereto by bolts 9, said flanges 8 having a square hole 10 through the center thereof adapted to fit over the square end 12 of crank shaft 11 adapted to prevent crank shaft 11 from turning, the end 11$^a$ of said crank shaft 11 being threaded to receive a carbureter connection, said shaft 11 having a hole 13 of the required size bored longitudinally therethrough, adapted to admit the mixture of air and gas produced through a carbureter not shown, to the inside of inner rotating casing 14, said inner casing 14 having supporting flange 15 fastened thereto by bolts 16, said flange 15 having an outward projection 17 into which stationary crank shaft 11 is inserted, the outer portion of said projection 17 revolves in bearing 7 and around stationary crank shaft 11, on the opposite side of rotating casing 14 is supporting flange 18, said flange 18 being fastened to inner rotating casing 14 by bolts 19, this end of said crank shaft 11 being inserted in said outer portion 20 of said supporting flange 18, said flange 18 revolving around said stationary crank shaft 11 and in bearing 6 in said outer casing projection 4, the outer end of said flange 18 being connected to driven shaft 21 in any suitable manner, said shaft 21 being driven by the rotation of inner casing 14, inside of inner casing 14 is shown a plurality of compression cylinders 22, having pistons 23, and connecting rods 24, said connecting rods 24 being connected to crank shaft 11, by connecting rod 24$^a$, each of said connecting rods 24 are connected with crank pins 24$^b$ on connecting rod ring 24$^c$, said crank shaft 11 having a center bearing 25 held in place by support 26, said support being fastened to inner casing 14 by bolts 27. Main intake ports are shown at 28 in casing 14, a plurality of intake valves are shown at 29 leading from intake ports 28.

A plurality of compression valves 30 are shown in Fig. 2 leading the compressed charge from compression cylinders 22 to a plurality of compression ports 31 and from said ports 31 to a plurality of combustion chambers 32, when the compressed charge is exploded and expands into a plurality of expansion chambers 33. Said compressed charge being exploded by a plurality of electric spark connections 34, when the same comes in contact with outside electric connection 35 on the outside of casing 1, a plurality of cut off valves are shown at 36, between combustion chambers 32 and expansion chambers 33, operated by a plurality of cam grooves 37 on the inside of casing 1 adapted to open and close said combustion chambers 32 and expansion chambers 33 at predetermined periods, the same being adapted to give the compressed exploded charge a quick expansion into expansion chambers 33 to increase the power stroke thereof, a plurality of exhaust ports 38 are shown in outer casing 1 connecting with expansion chambers 33 at predetermined periods, a plurality of expansion chamber stationary heads 39 are shown fastened to outer casing 1 by bolts 40, said expansion chamber stationary heads 39 pass through a plurality of slots 41 in rotating heads 42, as inner casing 14 rotates. Internal gear 43 is shown fastened to the inner side of outer casing 1, the same meshing with a plurality of intermediate gears 44 which in turn mesh with a plurality of gears 45, said gears 45 being connected to inner rotating head 42, said rotating heads 42 turning on bearings 46, around bolt 47, said bolt passing through boxes 48—49, adapted to hold said gears 44—45 and said rotating heads 42 in place, said boxes 48—49 are fastened to the inner portion of inner rotating casing 14 in the required positions, and held in place by expansion chamber rings 50—51, said expansion chamber rings are held in place around inner rotating casing 14 by bolts 52. A detail of intake valves 29 is shown in Fig. 8 having controlling spring 29$^a$ and stop pin 29$^b$, with securing pin 29$^c$, said valve resting on valve seat 29$^d$, these valves are set in casing 29$^e$, said casing being fastened to expansion chamber rings 50—51. A detail of compression valves 30 is shown in Fig. 7 having controlling spring 30$^a$, said valves 30 resting on valve seat 30$^b$, these valves are set in casing 30$^c$, said casing being fastened to expansion chamber rings 50—51 by cap 30$^d$.

The operation of my rotary internal combustion engine, is as follows, gas vapor is drawn through carbureter, and through hollow shaft into inner casing, thence through the intake ports into the compressing cylinders, these compressing cylinders draw the gas in on the down stroke, compressing on the up stroke into the compression chambers, while said gas is under compression, the exploding chamber takes said compressed gas to expansion chambers when the same is exploded and passes to the expansion chambers and does its work against the rotating head, and the stationary head, this results in the turning of the inner casing, one explosion follows closely behind the preceding explosion, causing the inner casing to revolve at any speed required.

While this specification sets forth in detail the present and preferred construction of my internal combustion engine, still in practice such deviations from such detail may be resorted to as do not form a departure from the spirit of the invention.

Having thus described my invention, what I claim as new and desire to secure by Letters Patent is:—

1. In a rotary internal combustion engine, of the class described comprising a metal body outer casing cast in two pieces, having metal supports which are an integral part thereof, means by which said two pieces are fastened together, main projections, which are an integral part of said outer casing, adapted to retain bearings therein, a flange and means of fastening said flange to one of said main projections, a crank shaft having a plurality of cranks forming said crank shaft, one end of said crank shaft being square, said flange being adapted to engage the square end of said crank shaft and hold the same rigid, means for connecting a carbureter to the end of said crank shaft, means by which the mixture of air and gas is admitted through said crank shaft, substantially as shown and described.

2. In a rotary internal combustion engine of the class described comprising a metal body outer casing cast in two pieces, and having main projections which are an integral part thereof, an inner rotating casing, said inner rotating casing having a supporting flange fastened thereto, said flange having an outward projection which is an integral part thereof, a stationary crank shaft inserted in said outer projection, a bearing in said outer projection adapted to allow said inner rotating casing to revolve around said stationary crank shaft, a supporting flange fastened to the opposite side of said inner rotating casing, a bearing in said supporting flange adapted to allow said inner rotating casing to revolve around said stationary crank shaft, substantially as shown and described.

3. In a rotary internal combustion engine of the class described comprising a metal body outer casing in two pieces, having metal supports which are an integral part thereof, an inner rotating casing, a stationary crank shaft positioned in said inner and said outer casing, means by which said crank shaft is held rigid in said outer casing, means by which said inner casing revolves around said crank shaft, a supporting flange fastened to said inner casing, a driven shaft, and means by which said driven shaft is connected to said supporting flange, a plurality of compression cylinders positioned in said inner casing, each of said compression cylinders having piston and connecting rod, means by which said connecting rods are connected to said crank shaft, a center bearing for said crank shaft in said inner casing, support for said center bearing, and means by which said support is fastened to said inner casing, substantially as shown and described.

4. In a rotary internal combustion engine of the class described, comprising a metal body outer casing cast in two pieces, said outer casing having metal supports and outer projections which are an integral part thereof, an inner casing and means by which the same is connected to and revolves inside of said outer casing, a crank shaft and means by which said crank shaft is made rigid to said outer projection of said outer casing, a plurality of compression cylinders positioned in said inner casing, means by which the same is connected to said crank shaft, a plurality of intake ports in said inner casing, a plurality of intake valves positioned in said inner casing, a plurality of compression valves positioned in said inner casing, a plurality of compression chambers and expansion chambers in said inner casing, substantially as shown and described.

5. In a rotary internal combustion engine of the class described, comprising a metal body outer casing cast in two pieces, said outer casing having metal supports which are an integral part thereof, main projections, which are an integral part thereof, an inner casing positioned inside of said outer casing, a plurality of spark connections positioned in said outer and inner casings, a plurality of cutoff valves operated by cam grooves in said outer casing, a plurality of exhaust ports in said outer casing, a plurality of expansion chamber stationary heads in said outer casing, a plurality of rotating heads having a plurality of slots therein, a plurality of expansion chamber stationary heads adapted to pass through said slots, an internal gear fastened to the inner side of said outer casing, a plurality of intermediate gears, a plurality of gears connected to said inner rotating heads, bearings on which said rotating heads turn, boxes adapted to hold said gears and said rotating heads in place, expansion chamber rings, means for holding said expansion chamber rings in place around inner rotating casing, substantially as shown and described.

In testimony whereof I affix my signature in the presence of two subscribing witnesses.

WILLIAM M. SUBLETTE.

Witnesses:
  ROBT. D. PEARSON,
  CHAS. CLIFFORD.